Nov. 20, 1923.
C. R. KING
RESILIENT SAFETY TREAD
Filed Nov. 29, 1919
1,474,481
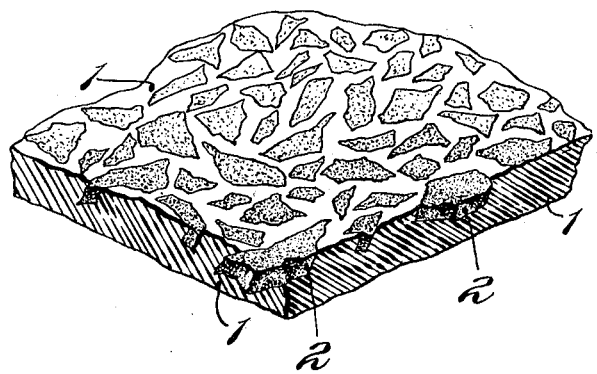
WITNESS
INVENTOR
CLARENCE R. KING Patented Nov. 20, 1923.

1,474,481

UNITED STATES PATENT OFFICE.

CLARENCE R. KING, OF WORCESTER, MASSACHUSETTS, ASSIGNOR TO NORTON COMPANY, OF WORCESTER, MASSACHUSETTS, A CORPORATION OF MASSACHUSETTS.

RESILIENT SAFETY TREAD.

Application filed November 29, 1919. Serial No. 341,370.

*To all whom it may concern:*

Be it known that I, CLARENCE R. KING, a citizen of the United States of America, residing at Worcester, in the county of Worcester and State of Massachusetts, have invented certain new and useful Improvements in Resilient Safety Treads, of which the following is a full, clear, and exact specification.

My invention relates to safety tread surfaces and more particularly to a wear-resisting, anti-slipping tread which will not only prevent a pedestrian slipping thereon but will also serve as a resilient cushion to absorb shocks and afford an easy walking surface.

It has been proposed to make a safety tread of hard, wear-resisting materials, such as crystalline alumina, bonded together by a vitrified clay material. Although such treads present highly anti-slipping qualities and are resistant to the ordinary abrasions of pedestrian traffic, yet, being of the nature of stone material, they may not be able to withstand heavy shocks, such as may be caused by dropping heavy objects thereon and they do not afford a resilient cushion to soften the blows incident to walking thereon. It is also found to be difficult to produce ceramic bonded tiles in uniform colors and to duplicate results previously obtained because of unavoidable variations in successive ceramic firing operations. Furthermore, ceramic bodies are ordinarily porous and pervious to water with the result that such treads absorb moisture and become dirty in appearance and difficult to clean.

It is, accordingly, the main object of my invention to provide a resilient cushioning tread which is highly anti-slipping and which lasts indefinitely under ordinary wearing conditions and remains uniformly non-slipping in its characteristics.

It is another object of my invention to provide a tread surface which is not only highly resistant to fracture and is anti-slipping, but is also non-porous and easily cleaned and kept in a sanitary condition, and which may be easily colored to produce and duplicate any desired artistic effect.

With these and other objects in view as will be apparent from the following disclosure, my invention resides in the subject matter described in the specification and set forth in the claims appended hereto.

Referring to the drawing, I have there illustrated a perspective view of a fragment of a tread surfacing adapted to be used as a step.

In accordance with my invention, I provide as a body portion a resilient cushioning matrix of which rubber may be cited as a specific example, and incorporate therein anti-slipping bodies which are integrally bonded by said matrix into a unitary tread slab. For the non-slipping bodies, I may utilize extremely hard, wear-resisting abrasives, such as the artificial and natural forms of crystalline alumina or silicon carbide, which have a hardness of at least nine on Moh's scale, as well as abrasive materials of lesser hardness, such as garnet, spinel, beryl, quartz, etc., the essential characteristics thereof being the ability to remain wear-resistant and anti-slipping under ordinary pedestrian footwear and in a form adapted to adhere firmly to and be bonded by the cushioning body.

In order that I may bond such hard abrasive materials in a highly elastic, inherently mobile medium which is subject to stresses and changes in form, I bond a plurality of small grains of the anti-slipping materials into larger and preferably rough surfaced bodies or chips which will be mechanically held in place much more firmly than the finer abrasive material. Of the various suitable bonding matrices, known as abrasive bonds, which will serve to unite the anti-slipping grains into integral bodies, I may employ such ceramic materials as the silicate mixtures, well known in this art, which are capable of being fire hardened, or clay materials which are burned vitrified to produce porcelain or glassy bonded structures. I may also utilize other cementitious abrasive bonding ingredients, such as various organic substances including the artificial and synthetic resins, rubber and similar adhesive plastic materials capable of being set to a hard mass. The essential characteristic of these bonds is that they be able to bind the abrasive particles into hard, wear-resisting fragments or chips and continually present grains having sharp and angular edges on the surface to prevent slipping thereon. The proportions and compositions of these bonds may be selected as desired by workers skilled in the art.

As a specific example of a ceramic bonded chip I may utilize the following ingredients although obviously my invention is not limited thereto.

Slip clay—44 parts by weight.
Feldspar—44 parts by weight.
Ball clay—12 parts by weight.
Emery or electrically fused alumina—70% of the total mass.

These materials, after being suitably mixed and molded in accordance with well known operations, are fired to vitrify or fuse the clays and produce a hard bonded article of either a regular or an irregular form, both of which are herein referred to as "chips." If the molded article has faces too smooth and regular for my purposes, I may crush the same to provide chips of desired sizes and of irregular surfaces. If rubber is selected as the cushioning and supporting body, I incorporate these bonded chips in the rubber like a reinforcing aggregate and vulcanize it to the right degree to produce the desired elasticity and hardness, it being obvious that certain types of tread will require a more resilient bond than others. If it is desired to make a uniform and apparently homogenous tread slab, I bond the grains with rubber vulcanized to the desired degree of hardness.

In order to produce such a tread, I may utilize various rubber vulcanizing agents, such as sulphur in proportions varying from 3% to 33%, which is the ordinary range of standard practice; and various vulcanization accelerators may be employed to increase the vulcanization or to accelerate the reaction. The rubber is obviously used in this mixture in proportions which depend upon the amount of other ingredients present. To cut down the amount of rubber required, I may utilize various fillers well known in this art in proportions from 0 to 90%. In certain instances, I utilize abrasive grains or the fines resulting from crushing the bonded grains. If the fines are of the same material as the chips, then I make use of all the material which passes through the meshes of the classifying screens, which ordinarly need not be larger than one inch. If the tread is to be exposed to excessive wear, it is desirable that the chips occupy the major portion of the tread surface or that the spaces between projecting parts of the chips be so small as not to receive a material amount of wear.

The cushioning body may be colored by suitable dyes or pigments, depending upon the type of color and the bonding medium utilized. If I wish to obtain a red rubber tread, I add powdered iron oxide to the rubber mixture before vulcanization, and this oxide may be utilized in large enough proportions to serve not only as the coloring material but also as the filler. In order to give further color effects I may also subject the chips to suitable coloring operations. For example, a blue ceramic chip may be obtained by the addition of cobalt oxide to the clay bond before the firing operation.

In order to provide a safety tread for a car step which is hinged and adapted to be swung from a horizontal to a vertical position and so be subjected to considerable shock, I may utilize the construction illustrated in the drawing, involving a resilient cushioning body of rubber 1 having chips 2 of ceramic bonded alumina grain embedded and vulcanized therein. These chips, as illustrated, may be embedded mainly in the upper portion of the cushioning body in order that the lower part of the slab may have a high degree of resiliency. Although these chips are exposed on the surface of the tread, yet owing to their irregular shape and their size they are firmly bonded into the vulcanized rubber body and may give slightly to the pounding of footgear owing to the cushion support and yet not be torn from their settings.

Having thus described my invention, what I claim as new and desire to secure by Letters Patent is:

1. A safety tread comprising a resilient body and rough, anti-slipping chips embedded therein and forming a substantial portion of the tread surface, said chips containing hard, wear-resisting grains united integrally by an abrasive bond which is relatively softer and less wear-resistant than the grains and permits the surface to remain anti-slipping under continued traffic wear.

2. A safety tread comprising a rubber body and anti-slipping chips embedded therein which have substantially plane but rough top surfaces forming the major portion of the tread surface, said chips consisting of crystalline granules of a hardness of nine or more united by a bond which is relatively softer and less wear-resistant than said granules.

3. A safety tread comprising a body of resilient rubber and chips of ceramic bonded abrasive granules embedded therein.

4. A safety tread comprising a body of rubber, chips of ceramic bonded, wear-resistant grains embedded in said body and forming a substantial portion of the tread surface and coloring matter incorporated in said rubber to produce a color contrast between the body and the chips.

5. A safety tread comprising a rubber body and anti-slipping chips embedded in and forming a substantial portion of the surface thereof, said chips consisting of abrasive grains bonded by vitrified ceramic bonding material.

6. A safety tread comprising a resilient body of vulcanized rubber and a surface layer of chips, comprising crystalline alumina granules bonded with ceramic material, embedded in and bonded by the rubber body.

Signed at Worcester, Massachusetts, this 26th day of Nov., 1919.

CLARENCE R. KING.

Witness:
CLAYTON L. JENKS.